United States Patent [19]

Epel et al.

[11] Patent Number: 4,488,862
[45] Date of Patent: Dec. 18, 1984

[54] COMPRESSION MOLDING APPARATUS HAVING VACUUM CHAMBER

[75] Inventors: Joseph N. Epel, Southfield; Robert E. Wilkinson, Birmingham, both of Mich.; Horst F. Mach, Toledo, Ohio

[73] Assignee: The Budd Company, Troy, Mich.

[21] Appl. No.: 488,494

[22] Filed: Apr. 25, 1983

[51] Int. Cl.³ .......................... B29G 2/02; B29G 1/00
[52] U.S. Cl. ............................... 425/405 R; 156/382; 425/DIG. 60
[58] Field of Search ............. 264/219, 225, 338, 101, 264/102; 425/405, DIG. 60, DIG. 44, 405 R; 156/382

[56] References Cited

U.S. PATENT DOCUMENTS

| | | | |
|---|---|---|---|
| 2,452,382 | 10/1948 | Long | 425/405 |
| 3,504,070 | 3/1970 | Zaharski | 425/388 |
| 3,871,060 | 3/1975 | Ladney | 264/338 |
| 3,959,434 | 5/1976 | Squier | 264/225 |
| 4,092,393 | 5/1978 | Marocco | 264/102 |
| 4,267,142 | 5/1981 | Lankheet | 264/102 |
| 4,374,080 | 2/1983 | Schroeder | 264/102 |
| 4,416,841 | 11/1983 | Corea et al. | 264/102 |

Primary Examiner—Willard E. Hoag
Attorney, Agent, or Firm—Harness, Dickey & Pierce

[57] ABSTRACT

Apparatus is disclosed for compression molding a part from a charge having a curable resin therein. Provision is made for defining a vacuum chamber surrounding the mold cavity when the upper and lower dies are brought to a partially closed position. The vacuum chamber includes a vertically movable ring surrounding the upper die which is urged into sealing engagement with a surface surrounding the lower die. The space between the ring and the upper die is sealed with a flexible diaphragm having an inner edge rigidly attached to the upper die and an outer periphery rigidly attached to the ring member thereby permitting relative vertical movement between the ring and die. The mold cavity is rapidly evacuated and then the upper die is brought into a fully closed position while the resin cures.

4 Claims, 8 Drawing Figures

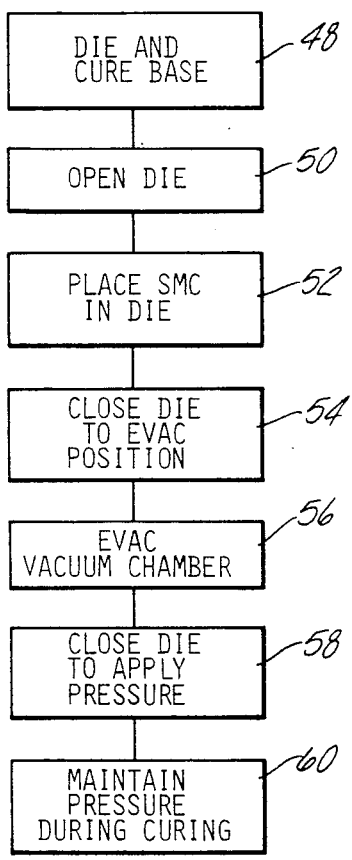
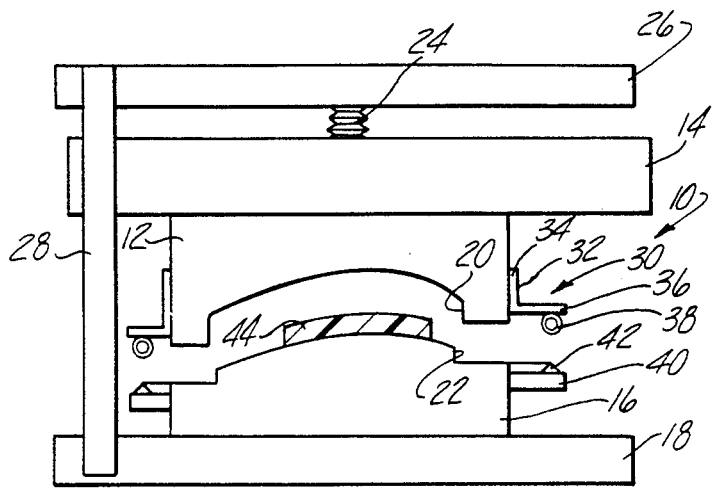
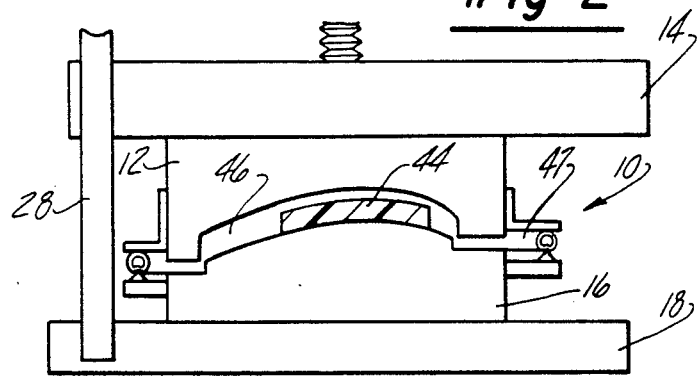
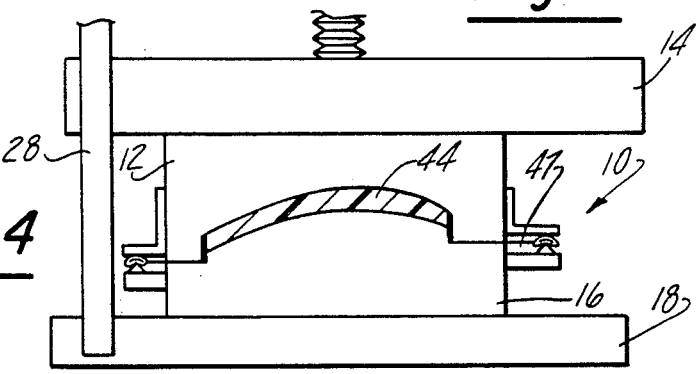
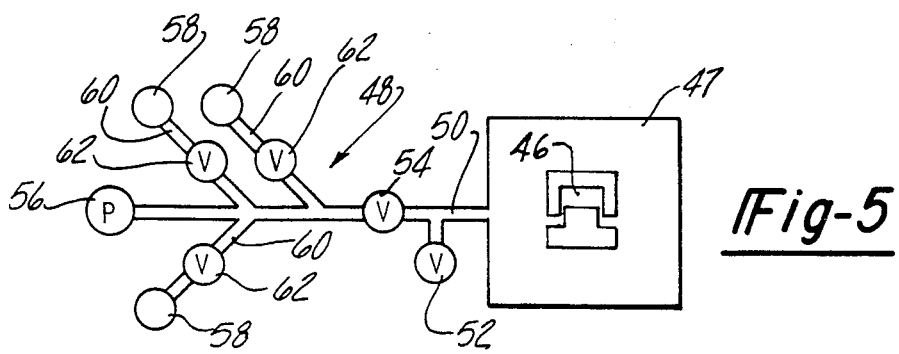

COMPRESSION MOLDING APPARATUS HAVING VACUUM CHAMBER

In one aspect this invention relates to molded thermoset articles. In a further aspect this invention relates to methods for making a thermoset molded article from fiber reinforced resin compounds. In yet a further aspect, this invention relates to equipment useful in making thermoset articles.

There has been an increased commercial use of parts which are molded from fiber reinforced resinous thermosetting materials. Such parts are generally made by compressing a mixture of resin and reinforcing fibers in a mold. The mold is generally formed of two or more pieces collectively called a mold set which is mounted within a press. When the separate dies of the die set are brought into proximity, these form a mold cavity which has the configuration of the finished part. The molds have associated heating means to heat and cure the resinous material to its thermoset condition. The materials most commonly used in molding techniques of this kind are resins which contain reinforcing fibers, such as glass, polyaramide or carbon fibers. The resin materials may also contain one or more solid particulate fillers. In general, such compounds are relatively viscous at room temperature and cure upon the application of heat via the heated mold set to a thermoset rigid condition.

The resin materials are generally formed into a sheet molding compound for ease of handling, several sheets can be stacked forming a charge having a thickness greater than the finished part to be formed into a desired shape. Such a charge is placed on the lower mold half and upon the application of pressure and mild heat from the dies, the sheet molding compound flows to fill the mold cavity.

Because the parts formed using these molding techniques are frequently complex in shape and include various ribs, bosses and other projections or complex dimensional configurations, not all portions of the mold are filled simultaneously. The uneven filling rate within the mold causes air to be entrapped within the molded part resulting in substantial porosity. The uneven filling can cause insufficient dispersion of the constituents within the mold. The porosity and non-uniform distribution, particularly of reinforcement fibers, cause surface problems. Air entrapment between layers will also create the aforementioned problems and lack of durability.

Surface defects on the parts are undesirable for a number of different reasons. Many of the molded parts require that the part be capable of receiving a smooth glossy finish such as that commonly applied to painted metal surfaces in order to blend in properly with assemblies to which the part is attached. Secondly, a part with defects and excessive porosity requires additional labor and processing to repair the defects prior to finishing. Such extra steps result in substantial extra costs thereby lessening the ability of sheet molded compound parts to compete with ordinary metal stamping or castings.

One method by which people have attempted to reduce surface porosity and increase the as molded smoothness of parts is reported in, *The 33rd Annual Technical Conference*, 1978, Reinforced Plastic Composite Institute, Section 9-F, pages 1–7. This article written by Gorsuch, et al, describes an attempt to make a low profile type sheet molding compound compression molding by drawing a vacuum on the mold cavity during molding. The authors of this article report that while there was an improvement in some areas of molding problems, there was " . . . however, simultaneously a generally acceptable increase in roughness and macroporosity . . . ". This article is indicative of the opinion held by those skilled in the sheet molding compound art that molding under vacuum was an unacceptable technique for achieving a smooth non-porous structure.

A method of making smooth surfaced parts by compression molding which has met with commercial success is the concept of applying a coating to an already molded part without removing it from the mold in order to provide a smooth pore free surface.

One typical example of such a technique and compounds useful therein is found in U.S. Pat. No. 4,081,578, issued to Van Essen, et al. This patent describes a method for coating a compression or injection molded part which has been completely cured to eliminate surface defects. The method includes placing a curable thermosetting coating composition on the surface of the article to be coated while the article is retained within the mold. After the coating has been applied to the part in the mold, the mold is closed and sufficient pressure is applied to the thermosetting coating to cause the coating composition to substantially uniformally cover and penetrate the surface of the coated article. Since injection molding of thermoset materials is done with heated molds, the heat present in the molds is used to cure the coating composition and bond it to the underlying surface being treated. The resulting coated article is removed from the mold. The applied coating provides an article with a substantially smooth surface with pores and voids filled.

The coating technique will generally provide a smooth molded surface covering any defects present in the part. However, such a solution requires that the part remain in the mold and a second operation be performed. The requirement for additional operations on the part consumes valuable machine time and lessens the amount of production which can be gained from a single mold. Further, the techniques require the use of sophisticated coating techniques to insure that the coating will properly bond to the surface of the part being coated and will be compatible and fill the porosity on the surface. Also, this technique requires sophisticated application mechanisms to insure that the proper dosage of coating compound is properly dispersed within the mold so that the coating uniformly covers the surface being treated.

Briefly, a method and apparatus have been developed which allows sheet molding compounds to be molded under a vacuum without substantial increase in macro porosity or surface roughness resulting in an acceptable part which can be painted or otherwise finished and which is produced with no need for additional finishing steps or coating either within or without the mold.

Also disclosed is an apparatus which allows the vacuum used in this invention to be properly applied to sheet molding compounds to minimize the loss of volatile agents contained within the resins.

The method of this invention is useful in compression molding a sheet molding compound using heated dies which when closed form a mold. In general, the method comprises the steps of placing the compound to be molded within the mold cavity when the dies are open. The dies are closed to a partially closed position to engage a vacuum seal, thereby sealing the mold cavity and surrounding area to form a vacuum chamber, without the upper die contacting the sheet molding compound contained within the mold cavity. The vacuum chamber is then evacuated to a reduced pressure of less than 7 inches of mercury absolute followed by closing the dies to a fully closed condition. Upon closing the dies, the sheet molding compound will spread and fill the mold. Upon reaching the fully closed position wherein the sheet molding compound has completely filled the mold, the mold cavity is again returned to atmospheric pressure while the molding pressure is maintained on the part during the remainder of the curing cycle.

After the part is thoroughly cured, the dies are opened allowing the removal of the finished part. In one embodiment of the apparatus of this invention a plurality of vacuum storage tanks are fluidly connected to the vacuum chamber. The vacuum tanks can be activated sequentially to withdraw a portion of the air within the mold cavity into the vacuum storage tank.

In the accompanying drawing:

FIG. 1 is a flow diagram illustrating the basic method of the present invention;

FIG. 2 is a cross-sectional view of an open mold and sheet molding compound prior to compression molding;

FIG. 3 is a sectioned side view of the mold of FIG. 3 in a partially closed, vacuum applying, position;

FIG. 4 is a sectional side view of the mold of FIG. 3 in the fully closed compression molding position;

FIG. 5 is a schematic diagram showing an arrangement for applying a vacuum to the mold cavity useful in the practice of this invention.

Figure 6:
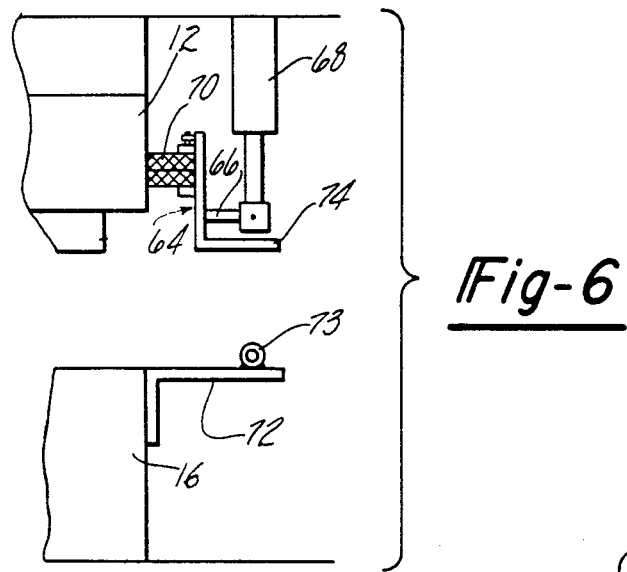
FIGS. 6-8 show various means for sealing the mold cavity.

FIGS. 2 through 4 depict the major steps in the sequence of molding operations employed while carrying out the process of the present invention. A compression die set 10 has an upper moveable die 12 mounted on a moveable upper platen 14 and a lower fixed die 16 mounted on a fixed bed 18. The upper and lower dies 12, 16 are complementary and form a mold in the closed position. The upper and lower dies 12, 16 slideably mate along complimentary vertical surfaces 20, 22 when the dies nest in a telescoping manner into the semi-closed and closed positions as shown in FIGS. 3 and 4.

The upper die 12 moves vertically relative to the fixed die 16 under the action of an actuator means 24 such as a hydraulic pneumatic actuator attached to a fixed upper platen 26 generally acting through a ram or rams attached to the moveable upper platen 14. The upper die 12 and associated moveable platen 14 move vertically along fixed vertical guide members 28 which maintain the dies in alignment. The lower end of guide 28 is rigidly mounted in the fixed lower bed 18.

The dies 12, 16 have a vacuum seal 30 associated therewith. As shown in FIGS. 2-4, the seal portion attached to upper die 12 comprises an L-shaped bracket member 32 having a vertical leg 34 attached to the upper die and a horizontal leg 36 extending outward perpendicularly from the upper die. The L-shaped bracket has a tubular member 38 attached. A lower sealing means comprising a horizontally disposed shelf 40 extending perpendicularly away from lower die 16 and a raised pointed bead disposed on the shelf 40, the bead being adapted to engage the tube 38. The bead 42 will engage the tube 38 at an intermediate position, as shown in FIG. 3, before the dies are fully closed to form a sealed vacuum chamber 47 of which mold cavity 46 within the die set 10 is a part. The tubing diameter is large enough to form the seal before the molding compound 44 flows to fill the mold but there is sufficient travel allowed by the seal that the dies can be fully closed without seal damage.

A piece of sheet molding compound 44 is placed on or in one of the dies when the dies are fully open. With the dies 12, 16 in the closed compression molding position shown in FIG. 4, the sheet molding compound 44 located within the cavity will slowly spread to fill the mold cavity 46 formed between the upper and lower dies.

As is common in compression molding techniques, the dies are heated by steam, oil or other heating means in order to provide sufficient energy to cure the resin present in the sheet molding compound to a hard thermoset condition.

Referring to the flow diagram shown in FIG. 1, the first step of any compression molding process is the provision of a die and cure base step 48 associated with a press suitable for applying the compressive force necessary to cause the sheet molding compound (SMC) to spread within the mold cavity as the mold is closed. The die is generally started in an open position step 50 with sufficient space between dies to allow the desired quantity of sheet molding compound, normally disposed as one or more sheets to be placed between the molds —step 52. The compound placed in the mold need not be formed in a rectangular shape and may have a configuration when viewed from the top like a dog bone or other configuration dictated by the flow of material within the die. Shaped charges are frequently used in order to equalize the time it takes for compound flowing from the charge to reach the outer portions of the mold.

The die set 10 is closed to an evacuation position (step 54) where the vacuum seal 30 is engaged and the interior cavity 46 of the die set is substantially sealed from the atmosphere as part of a vacuum chamber 47. This position will be reached before the upper die 12 contacts the SMC. When practicing this invention, it is desired that the plastic flow is primarily in a substantially reduced pressure environment maintained within the vacuum chamber 47.

The vacuum chamber 47 is evacuated in step 56 to the desired operating pressure. In general, pressures will be reduced in the die cavity to approximately less than 7 inches of mercury absolute prior to final molding and curing of the sheet molding compound. Since many sheet molding compounds contain a quantity of low molecular weight monomeric or polymeric materials used as solvents, reactants, cross-linkers, or catalysts, it is desirable to minimize the SMC's exposure time to the reduced pressure prior to the molding and curing of the compound. Minimizing the exposure time will minimize the amount of low molecular weight constituents that are withdrawn from the body of the sheet molding compound by the reduced pressre. The vaporization of low molecular weight compounds in reduced pressure atmospheres is well known and further discussion is not necessary. In particular, polyester compounds having low shrink characteristics contain a certain amount of styrene monomer in addition to the primary polyester reactants and a thermoplastic material. With drawing excessive amounts of styrene from the surface of the part will result in macro porosity and possible discoloration of the parts. Therefore, where polyester resins are used, it is desired to limit the evacuation time of the vacuum chamber to no more than 20 seconds.

After the mold is properly evacuated and the pressure therein has been reduced to approximately less than 7 inches of mercury absolute, the die is closed to its curing position in step 58 causing the sheet molding compound to spread and fill the mold cavity.

The press is maintained in the closed curing position during step 60 with the pressure continuously being applied by the dies to insure that the pressure is uniformly distributed throughout the sheet molding compound. Simultaneously heat is applied to the dies in order to cause chemical reaction between the constituents of the thermosetting resin forming a hard thermoset material. The thermoset resin consolidates and holds the fibrous reinforcement in a rigid consolidated condition.

The vacuum chamber 47 is returned to atmospheric pressure when the die has fully closed as shown in FIG. 4 since vacuum is not necessary and indeed may be harmful once the material has spread to completely fill the die cavity.

Yet a further understanding can be had by referring to FIG. 5 which illustrates a schematic diagram of the die cavity 46, vacuum chamber 47 and associated vacuum apparatus 48. The vacuum apparatus has storage tanks, a vacuum pump and a plurality of valves. As shown, the die cavity 46 represents the schematic mold or die set, such as that shown in FIGS. 3 and 4 located within vacuum chamber 47, which has a vacuum line 50 emanating from the interior of the chamber 47. The vacuum line 50 has an atmospheric exposure valve 52 attached to the vacuum line, the valve being operable between a first open position allowing atmospheric air to enter the valve in the vacuum line and a second closed position blocking the movement of air from the atmosphere into the vacuum line.

A vacuum line control valve 54 is disposed in the vacuum line 50 between the atmospheric exposure valve 52 and a vacuum pump 56 and associated vacuum storage tanks 58. In the open position, vacuum valve 54 connects the vacuum pump 56 and associated vacuum storage tanks 58 to the vacuum line 50. In the closed position, vacuum line valve 54 isolates the pump and its associated storage tanks 58 from the remainder of the system.

Three vacuum tanks 58 are shown separately connected to the terminus of the vacuum line by means of secondary vacuum lines 60 having secondary vacuum valve members disposed therein. In the open position, the secondary vacuum valve 62 will expose the vacuum line to the vacuum present within an associated vacuum storage tank 58 and in the closed position will isolate the associated vacuum tank from the remainder of the system.

The vacuum pump 56 is shown permanently connected to the terminus of the vacuum line 50. The vacuum pumps contemplated in the use of this invention can be positive displacement rotary vanes with an oil seal and water cooling. Such pumps are standard and well known in the art. Other forms of vacuum pumps can also be used.

The vacuum tanks or vacuum surge tanks 58 used can be standard water or propane type tanks, said tanks having sufficient strength to withstand atmospheric pressure when the interior of the chamber has been evacuated to approximately 7 inches of mercury absolute.

In operation, when the die set 10 has reached the evacuation position as shown in FIG. 3, and there is a vacuum seal, the atmospheric valve 52 will close and the vacuum line valve 54 will open exposing the interior of the mold cavity to the pumping action of the vacuum pump 56. A vacuum tank valve 62 will open for a short period of time, for example approximately 1 to 4 seconds and then close entrapping a substantial quantity of air contained in the vacuum chamber 47. A second vacuum tank valve will open for approximately 1 to 4 seconds withdrawing a substantial portion of the remaining atmosphere contained in the vacuum chamber 47 into the second associated vacuum tank at which time the second valve will close and a third valve will open exposing the vacuum chamber 47 to the rapid withdrawal action of the third associated vacuum tank. After all three vacuum tanks have been opened in sequence, the vacuum pump will continue to pump the die cavity 46 until the desired reduced pressure is reached at which time the die will close to the pressing or part forming position shown in FIG. 4. Once the die 10 has reached its fully closed position, the vacuum line valve 54 will close isolating the vacuum pump and associated tanks from the vacuum system and the atmospheric valve 52 will open allowing atmospheric pressure to flow back into the vacuum chamber 47. After the vacuum line valve 54 has been closed, the vacuum tank valves 62 will open and the vacuum pump 56 will empty the vacuum tanks for the next molding cycle.

In general, the volume of the tanks to be used will depend on the volume of the die cavity when the mold is in the evacuating position. Using a vacuum tank having a volume approximately equal to the vacuum chamber to be evacuated will result in reducing the pressure in the vacuum chamber by a factor of approximately one-half each time as evacuated vacuum tank is exposed to the system. Thus, by using three tanks it is possible to reduce the pressure in the die cavity to about one-eighth of the beginning pressure in a matter of approximately 3 to 12 seconds. If greater reduction is necessary, use of larger chambers or more chambers is possible.

A further way in which to reduce the amount of gas which must be removed from the vacuum chamber in order to achieve the desired pressure is to reduce its internal volume. Because the vacuum seal 30 is disposed about the periphery of the die, the vacuum chamber's volume which is contained within the vacuum seal can represent a considerable volume. This is especially true since the seal 30 must be shaped so as to allow it to function within the press necessitating certain compromises with respect to the shape of the seal and its location on the die set. Portions of the vacuum chamber which are not subjected to compression during the molding cycle, can be completely or partially filled with closed cell foam material which effectively reduces the volume to be evacuated during the evacuation cycle.

As shown, the system has used three vacuum tanks. More vacuum tanks may be used if desired, however, vacuum tanks in excess of approximately four or five represent a substantial member of operations necessary to evacuate the vacuum chamber and the use of more than three tanks would generally not be desirable from a production standpoint. Use of only a single tank equal in volume to the space to be evacuated within the die cavity results in reducing the pressure by a factor of only one-half and has been found that the use of a plurality of tanks provides the desired rapid evacuation in the vacuum chamber without undue complexity of machinery and control mechanisms.

Figure 7:
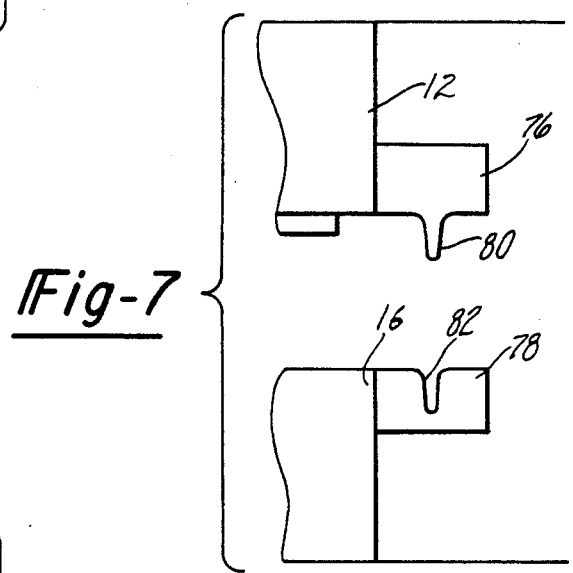
Figure 8:
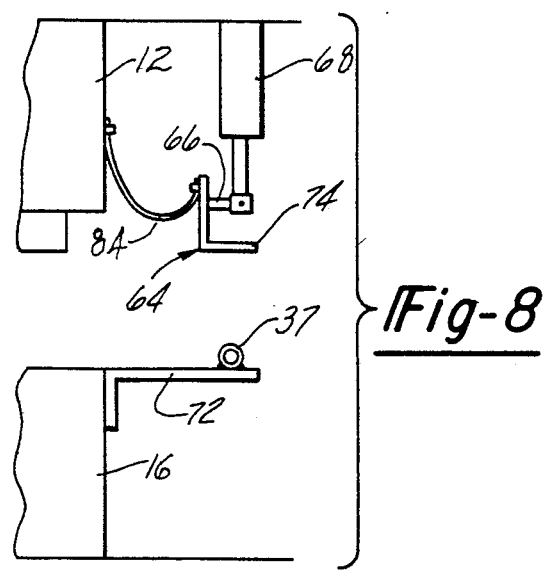

FIGS. 6, 7 and 8 show additional seal configurations useful in the practice of this invention. With reference initially to FIG. 6, the exterior of upper die 12 has been finished to a smooth parallel condition. A moveable ring 64 is mounted on a horizontal arm 66 which extends radially inward from an air cylinder 68 mounted to the press frame (not shown). The moveable ring 64 has a wiper blade and seal 70 mounted in a position to contact the side wall of die 12. The lower die exterior has an L-shaped (in cross-section) collar 72 attached thereto with one flange extending perpendicularly outward from the die wall. A strip of tubing 73 such as silicone tubing is disposed on the upper surface of the collar where it is contacted by a horizontally extending flange 74 of moveable ring 64. The flange 74 will contact the tube 73 when the dies are closed to the evacuating position.

FIG. 7 shows a sealing means formed of two complimentary elastomeric members 76 and 78 disposed about the periphery of the upper die 12 and base 16. As shown, sealing member 76 has a lip 80 depending therefrom toward the second sealing member 78. The second sealing member has a complimentary channel 82 adapted to receive the lip 80 to form a seal.

FIG. 8 shows a seal means similar to FIG. 6 except moveable ring 64 has a flexible diaphragm 84 sealing the ring to the moveable upper die. The outer periphery of the diaphragm is attached to the moveable ring and the inner edge of the diaphragm is attached to the upper die.

Various alternations and modifications of this invention will become apparent to those skilled in the art without departing from the scope and spirit of this invention. It is to be understood that this invention is not limited to the illustrative embodiments set forth hereinbefore.

What is claimed is:

1. Apparatus for compression molding a part from a charge having a curable resin therein, said apparatus comprising:

upper and lower die members defining a mold cavity therebetween generally corresponding to the shape of the desired part when the dies are closed;

press means for moving the die members relative to each other, said press means being operative to move the die members to an open position where the die members are spaced apart a sufficient distance to permit the charge to be placed on the lower mold, said press means being further operative to move the die members to a partially closed position where the mold cavity is essentially defined, but the upper die remains spaced from the charge, and said press means being subsequently operative to move the die members to a fully closed position where the upper die member contacts the charge causing it to spread and fill the cavity;

a fixed member providing a first horizontally extending surface, said fixed member surrounding the lower die and connected thereto in a fluid-tight manner;

a vertically movable ring member surrounding, yet spaced from, the upper die, which provides a second horizontal surface aligned with the first horizontal surface;

a resilient seal on one of the first or second horizontal surfaces;

flexible diaphragm means having an inner edge rigidly attached to the upper die and an outer periphery rigidly attached to the ring member for sealing the space between the ring and upper die while permitting relative vertical movement therebetween;

cylinder means for moving said ring member relative to the upper die member and being adapted to press the ring member surface against the first surface of the fixed member to create an air seal therebetween when the die members are moved to be partially closed position thereby defining a sealed vacuum chamber surrounding the mold cavity;

vacuum means for evacuating the sealed vacuum chamber to a reduced pressure of less than 7 inches of mercury absolute within less than 20 seconds; and said press means being operable to move the upper die to the fully closed position after the vacuum chamber has been evacuated whereby the resin in the mold cavity can spread and cure to form the finished part.

2. The apparatus of claim 1 wherein the vacuum means includes;

a plurality of tanks each having a volume at least as great as the volume of the mold cavity;

a first set of valves, each valve being associated with one of the tanks;

a vacuum pump;

means for connecting the vacuum pump to each of the tanks through the first set of valves, operative to evacuate the tanks when the valves are open, with the valves being subsequently closed after evacuation thereof;

a passageway connecting the tanks and the vacuum pump to the vacuum chamber;

a second valve in said passageway adapted to control fluid communication between the vacuum chamber and the pump and tanks; and an atmospheric valve adapted to expose the vacuum chamber to atmospheric pressure; and wherein said atmospheric valve is closed and the second valve open when the die members are moved to the partially closed position, with the first set of valves being adapted to sequentially open and close to thereby evacuate air in the mold cavity into the individual tanks; and wherein the second valve is closed and the atmospheric valve opened to re-expose the mold cavity to atmospheric pressure after the die members have been moved to the fully closed position.

3. The apparatus of claim 1 wherein said resilient means comprises:

a flexible tube mounted to the horizontal surface of the ring member.

4. The apparatus of claim 1 wherein closed cell foam material is disposed interiorly of the seal between the first and second horizontal surfaces and the mold cavity filled with the charge to thereby reduce the effective volume to be evacuated.

* * * * *